/ 
US008718613B2

(12) United States Patent
Tow et al.

(10) Patent No.: US 8,718,613 B2
(45) Date of Patent: May 6, 2014

(54) REMOTE VIEWING APPARATUS FOR SMARTPHONE

(76) Inventors: Daniel Tow, Palo Alto, CA (US); Bruce Tow, San Francisco, CA (US); Tira Oskoui, Palo Alto, CA (US)

( * ) Notice: Subject to any disclaimer, the term of this patent is extended or adjusted under 35 U.S.C. 154(b) by 26 days.

(21) Appl. No.: 13/351,228

(22) Filed: Jan. 17, 2012

(65) Prior Publication Data

US 2013/0183943 A1     Jul. 18, 2013

(51) Int. Cl.
*H04M 3/42*    (2006.01)
*G09G 5/00*    (2006.01)
(52) U.S. Cl.
USPC ........................................ 455/414.1; 345/2.1
(58) Field of Classification Search
USPC ........................................ 345/2.1; 455/414.1
See application file for complete search history.

(56) References Cited

U.S. PATENT DOCUMENTS

| 5,438,662 | A  | * | 8/1995  | Randall ........................ 715/776 |
| 5,847,698 | A  | * | 12/1998 | Reavey et al. ................ 345/173 |
| 7,218,315 | B2 | * | 5/2007  | Takeuchi et al. ............. 345/204 |
| 7,748,634 | B1 | * | 7/2010  | Zehr et al. .................... 235/492 |
| 7,843,411 | B2 | * | 11/2010 | Manning ........................ 345/87 |
| 2004/0127254 | A1 | * | 7/2004  | Chang ............................ 455/557 |
| 2004/0254975 | A1 | * | 12/2004 | Teh et al. ...................... 709/200 |
| 2006/0170669 | A1 | * | 8/2006  | Walker et al. ................. 345/418 |
| 2011/0216376 | A1 | * | 9/2011  | Rutman ......................... 358/448 |

OTHER PUBLICATIONS

Kindle Users Guide 5th Edition, Copyright 2004-2010—release date 2007.*
Amazon Kindle Wiki Page, downloaded Sep. 20, 2012.*

* cited by examiner

*Primary Examiner* — Jinsong Hu
*Assistant Examiner* — William Nealon
(74) *Attorney, Agent, or Firm* — ARC IP Law, PC; Joseph J. Mayo

(57) ABSTRACT

Enables a synergy between a consumer's Smartphone such as an IPHONE® and an inexpensive, energy-efficient electronic-reader type device, to provide the consumer the features of a more-expensive and higher-energy-use device by relegating capabilities requiring keyboard use e.g., physical or electronic, touch-screen, wireless-connection, telephony-connection e.g., 3G/4G, microphone, speaker, and more to the Smartphone while supporting where desired full-power standalone document-display features to the electronic reader. Apparatus includes an electronic-reader device with an electronic-ink screen and a small number of buttons to perform standalone features such as "display next page"; a low power transceiver, memory, processing hardware, and associated software and battery. The electronic-reader device is especially designed to prevent inappropriate distribution of copyright-protected material.

18 Claims, 6 Drawing Sheets

REMOTE VIEWING APPARATUS FOR SMARTPHONE

BACKGROUND OF THE INVENTION

1. Field of the Invention

One or more embodiments of the invention are related to the field of personal consumer electronics. More particularly, but not by way of limitation, one or more embodiments of the invention enable a device that is external to a Smartphone which provides a simplified, extended-battery-life, and expanded-screen display of Smartphone-accessible e-books, documents, and other text attached to the Smartphone via a wireless, such as BLUETOOTH®, or optional wired, such as micro-USB, connection.

2. Description of the Related Art

Current electronic book and other-document readers are designed primarily as standalone devices. Such devices necessarily include hardware and software that enables functions such as searching, purchasing, document selection, etc.

In most if not all cases, these features require either a physical keyboard increasing cost while decreasing available screen space proportionate to total device size or a partially or fully touch-sensitive screen materially increasing device cost. Either of these approaches increases manufacturing and consequent consumer cost.

Further, these devices typically search for and receive readable content via either wireless-Internet or wireless telephony e.g., 3G/4G connections, which require both costly and potentially physically bulky hardware and corresponding high-energy use which lowers battery life.

Further, these devices typically require that the user choose whether to buy readable content for use on devices supporting an illuminated-type or on devices supporting an electronic-ink-type screen, where each screen type has it advantages and disadvantages. Purchased readable content is generally difficult to transfer between such device types without repurchase.

For at least the limitations described above there is a need for a remote viewing apparatus for Smartphone.

BRIEF SUMMARY OF THE INVENTION

One or more embodiments described in the specification are related to a remote viewing apparatus for Smartphone that enable a device that is external to a Smartphone which provides a simplified, extended-battery-life, and expanded-screen display of Smartphone-accessible e-books, documents, and other text attached to a Smartphone via a wireless, such as BLUETOOTH®, or optional wired, such as micro-USB, connection. Most of the material to be displayed on the remote viewing device will be copyright-protected and the new device must and will provide protection of copyrights comparable to the protection already provided for the same copyrighted material already stored on the Smartphone.

Specifically, embodiments of the invention enable an electronic display unit that utilizes and takes advantage of wireless or wired links of a Smartphone. Such a link offers the linked Smartphone to use its pre-existing BLUETOOTH® or other wireless interface, physical or electronic keyboard, etc., to link to the apparatus. The Smartphone may also provide a Smartphone application, aka., "app", that provides all capabilities requiring more-expensive and energy-hungry capabilities such as search, purchase, microphone, speaker, and wireless-Internet or telephony e.g., 3G/4G/WiFi external access for the apparatus. Because of the synergy between the consumer's existing Smartphone and the apparatus, the apparatus itself can be lighter, thinner, less expensive to manufacture, more energy-efficient, and offering a greater display-to-total-footprint ratio. Furthermore, the apparatus is very simple to load with reading material already purchased for use on illuminated-display reading devices, for readers who sometimes prefer one device type and sometimes prefer another, yet this simplicity of transfer creates relatively little risk of copyright violation for reading-material providers because the new device will be configured to be strictly subordinate to a single "parent" copyright-material-owning device at a time, unable to retain at any time copyrighted material received from more than one parent device. (If the new apparatus was permitted to accept copyright-protected material from a provider device while retaining material earlier-downloaded from another provider device, then the apparatus owner could illegitimately accumulate a library of such material from devices owned by friends and illegitimate resellers of the material. Users could download a set of material that they do not own strictly from a single source, but they already have that ability on standard book-reader devices, which are normally permitted to "sync" to any one owned library or account while discarding anything previously downloaded from another library or account.) For further protection of the copyrighted material, the device can securely identify itself as a safe, subordinate device to receive copyright-protected material, certified not to accumulate material from multiple sources and certified as unable to send copyright-protected material onwards to other devices. Secure identification could use any well-known standard communication protocol designed for that purpose, such as challenge-response authentication.

Embodiments of the invention solve the problems outlined in the description of the related art by a system and method that includes:

A rigid, protective case with a built-in low-energy-use, electronic-ink-type screen, for example optionally a screen which uses no energy while displaying a given page.

A wireless, for example BLUETOOTH® or low power BLUETOOTH® transceiver to link to the consumer's Smartphone. The transceiver may optionally connect and use energy only when actually performing data exchange with the consumer's Smartphone in order to conserve energy, and may completely shut down when physically connected, e.g., via a hardwired micro-USB connection to the Smartphone both in order to conserve energy and to be airline-compliant.

A memory chip with enough memory, e.g., 1 GB, to hold many documents on the apparatus as well as all necessary apparatus software.

apparatus software/firmware to support all apparatus features.

A processor to run apparatus software/firmware, for example a low power microcontroller. In one or more embodiments of the invention, the processor may ensure that a copyright controlled set obtained from a first external Internet enabled device is erased from the memory if the memory is not regularly synchronized with the first external Internet enabled device, after which only action from a second external Internet enabled device is considered as the action from the single parent copyright-material-owning device. Furthermore, in at least one embodiment of the invention, the processor may eliminate copyright controlled data associated with the first external Internet enabled device, after which only action from the second external Internet enabled device is considered the action form the single parent copyright-material-owning device.

A rechargeable battery.

A wired, such as micro-USB female connector, or any other desired connector type to use both in recharging the apparatus battery and to connect to the consumer's Smartphone.

An on-off switch.

A small number of buttons or switches for simple intra-apparatus actions, which would include at least the following:

Request on-demand activation of the wireless connection to the consumer's Smartphone.

Next and previous page display for the current document, display, e-book, etc.

Next and previous section or chapter display for the current document, display, e-book, etc.

Display of and selection from the apparatus's "bookshelf" of available, already downloaded documents, e-books, etc.

In tandem with the above embodiment of this invention, but external to the invention, there would also be:

A Smartphone "app" with at least these features:

Ability to use the Smartphone's wireless or wired connection to communicate with the apparatus.

Ability to look at and pick from the list of documents, e-books, etc. on the apparatus.

Ability to search external libraries and e-book "stores" to find, locate, purchase, and download documents, e-books, etc.

Ability to recognize a connection to the apparatus that can safely receive copyright-protected material and to upload documents, such as but not limited to PDF files, e-books, etc., to the apparatus.

Ability to share expanded-display Smartphone-screen content with the apparatus i.e., to use the apparatus as an expanded screen display to supplement the Smartphone's smaller display size.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A remote viewing apparatus for Smartphone will now be described. In the following exemplary description numerous specific details are set forth in order to provide a more thorough understanding of embodiments of the invention. It will be apparent, however, to an artisan of ordinary skill that embodiments of the invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
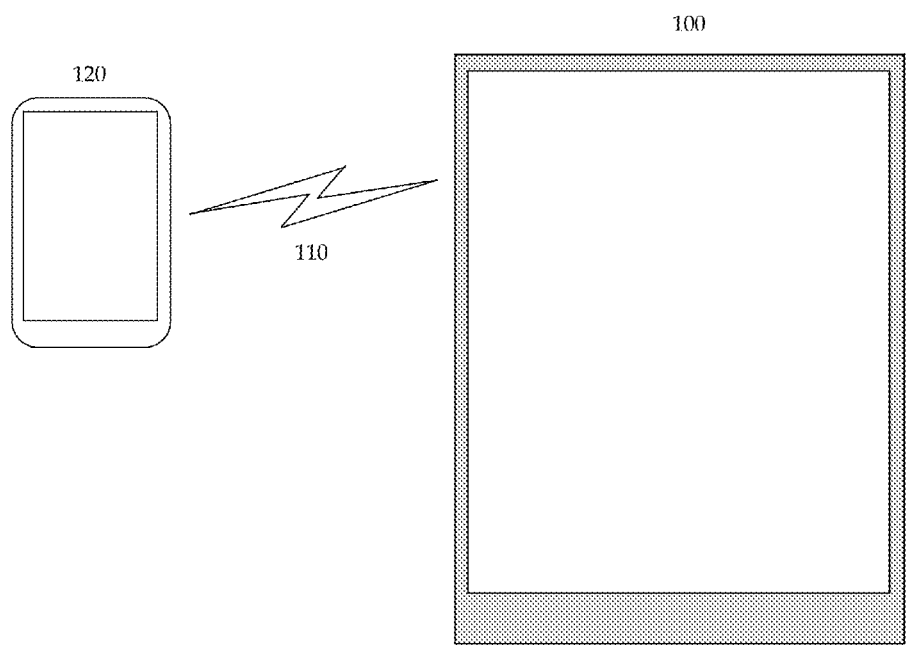
FIG. 1 illustrates a wireless architecture diagram wherein an embodiment of the apparatus communicates with a Smartphone via a wireless connection.

FIG. 1 illustrates a wireless architecture diagram wherein an embodiment of the apparatus communicates with a Smartphone via a wireless connection.

The apparatus 100 can be connected via a wireless, such as BLUETOOTH®, connection 110 to a Smartphone 120.

Figure 2:
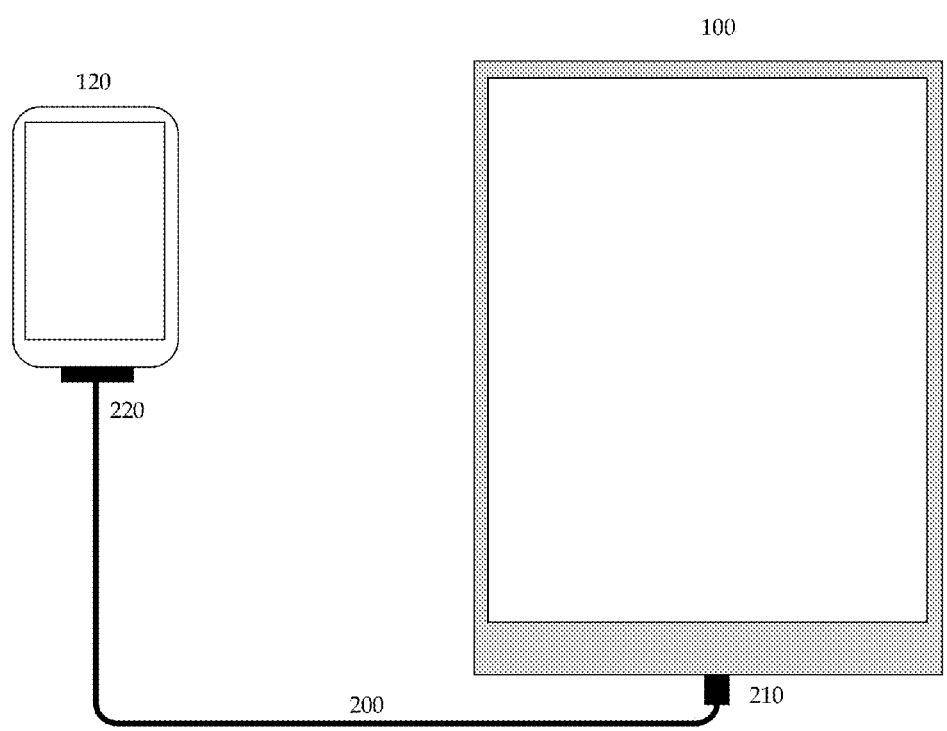
FIG. 2 illustrates a wireless architecture diagram wherein an embodiment of the apparatus communicates with a Smartphone via a hardwired connection.

FIG. 2 illustrates a wireless architecture diagram wherein an embodiment of the apparatus communicates with a Smartphone via a hardwired connection.

Apparatus 100 can be connected via hardwired connection 200 to Smartphone 120. On the apparatus side, hardwired connector 210 such as a micro-USB connector may be used for power and battery recharging as well as for Smartphone 130 or server not shown information exchange. The connection on the Smartphone side uses the Smartphone's standard data-exchange port 220; to a server, not shown for brevity, the connection uses a standard connector, for example such as USB or micro-USB; in addition to or in the alternative the connection may be a wireless connection. To save energy and to prevent aircraft-transmission problems, plugging in the wired connector may automatically turn off the apparatus's wireless connection if that connection is active.

Figure 3:
FIG. 3 illustrates a front view of an embodiment of the invention.

FIG. 3 illustrates a front view of an embodiment of the invention.

Apparatus 100 may include a rigid plastic or metal case 300. One or more embodiments of the invention may utilize a display that includes an electronic-ink, non-touch-sensitive screen that uses no power except when changing display contents i.e., uses power to change display contents but uses no power to continue to display the same contents. The display may be embedded in the front of the device. One or more embodiments of the invention may be implemented with a minimal list of buttons or switches 320 on the lower front of the device that allow the apparatus user to interact with the apparatus to move between pages of content within a document or other displayed content, change between documents on the apparatus's "bookshelf", and to initiate wireless connectivity, which is normally "off" to save energy.

Figure 4:
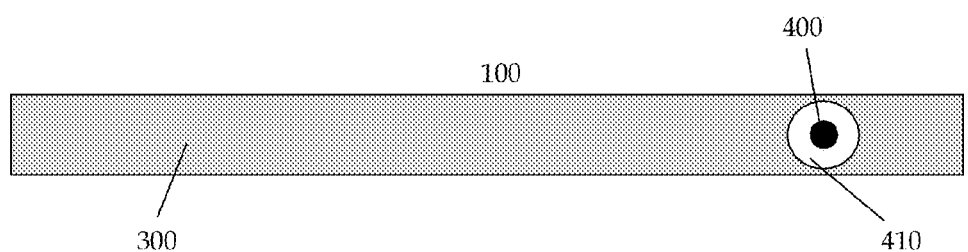
FIG. 4 illustrates a top view of an embodiment of the invention.

FIG. 4 illustrates a top view of an embodiment of the invention.

Figure 5:
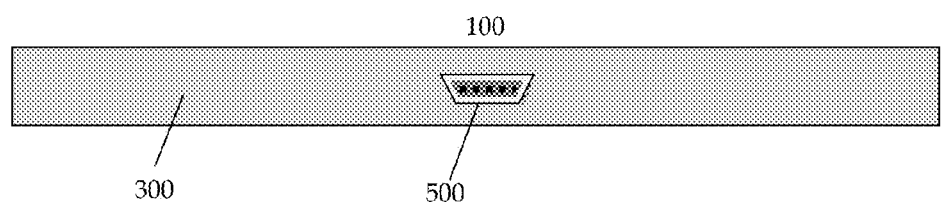
FIG. 5 illustrates a bottom view of an embodiment of the invention.

In one or more embodiments, at the top right of the case is button 400 set within shallow well 410 to prevent accidental button pushes. If the apparatus is off, pressing button 400 will turn on apparatus 100. If the apparatus is on, pressing button 400 for more than three seconds may optionally turn off apparatus 100. If the apparatus is on and no button is pushed for a predetermined time, for example at least 10 minutes, apparatus 100 automatically turns itself off but may store a reference to the currently viewed document and location within the document that was being viewed. Subsequently turning apparatus 100 on may automatically restore the display of the previously shown document at the same location that it was being viewed when apparatus 100 was turned off or turned itself off FIG. 5 illustrates a bottom view of an embodiment of the invention.

At the bottom center of the case is standard female port 500 such as a micro-USB port, that may be slightly recessed into the case to prevent accidental damage to that port. This port may be used both to exchange data with other devices such as a Smartphone or a server, and to power apparatus 100 and/or charge its battery.

Figure 6:
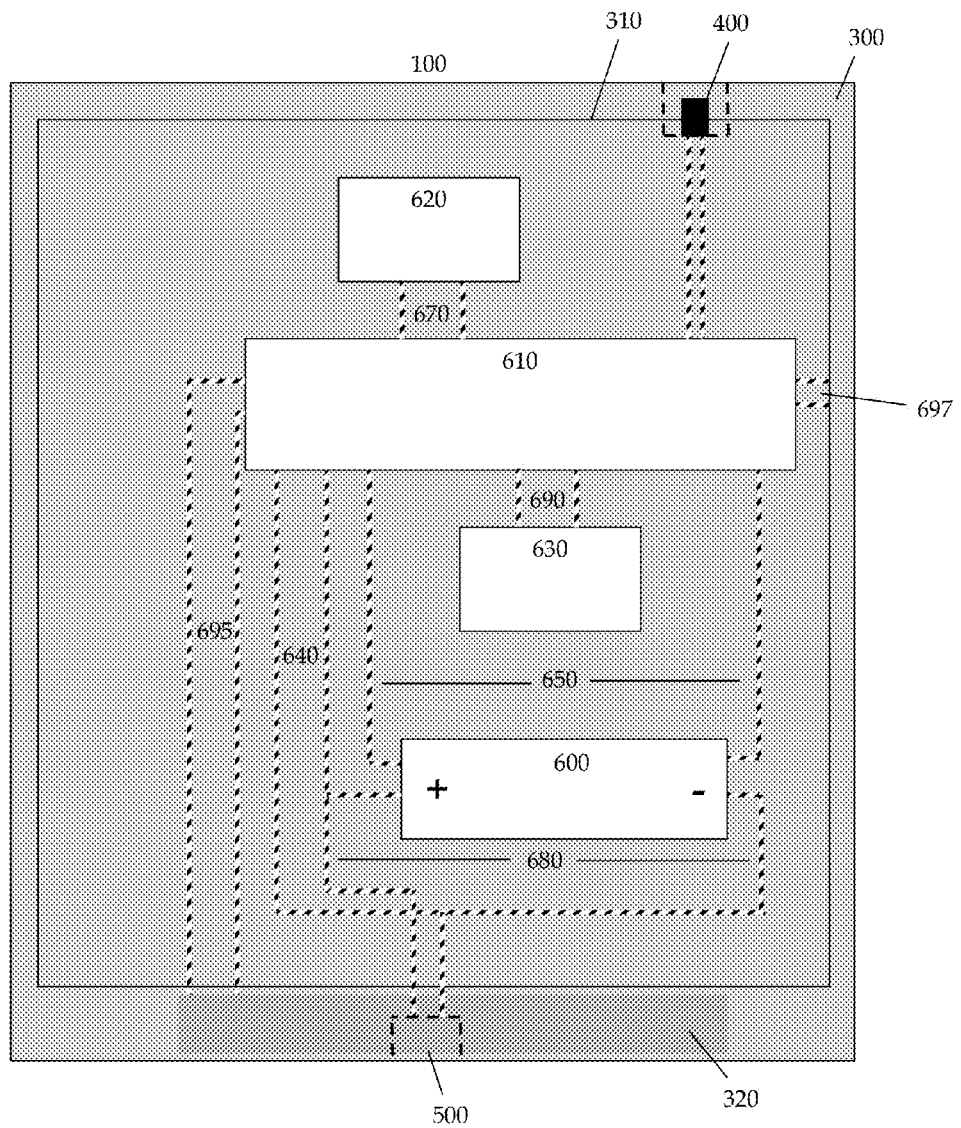
FIG. 6 illustrates an embodiment of the internal configuration of the apparatus.

FIG. 6 illustrates an embodiment of the internal configuration of the apparatus.

The electrical and electronic components of the apparatus may be located within rigid case 110 and may include the following components, 12-volt rechargeable battery 600, processor 610 that is configured to execute program instructions to particularly implement the methods of the apparatus, wireless transceiver 620, memory unit 630 which may optionally not require power to retain information, display 310, for example an electronic-ink-type display, wiring 640 between hardwired port 500 and processor 610, wiring 650 between battery 600 and processor 610, wiring 660 between on/off switch 400 and processor 610, wiring 670 between wireless transceiver 620 and processor 610, wiring 680 between hardwired port 500 and battery 600, wiring 690 between processor 610 and memory unit 630, wiring 695 between lower-front buttons 320 and processor 610, wiring 697 between display 635 and processor 610.

While the invention herein disclosed has been described by means of specific embodiments and applications thereof, numerous modifications and variations could be made thereto by those skilled in the art without departing from the scope of the invention set forth in the claims.

What is claimed is:

1. A remote viewing apparatus comprising:
   a display;
   a memory that is persistent and configured to store and retrieve a first copyright controlled data set including text and messages;
   a transceiver configured to communicate with at least a first external Internet enabled device using a low power point to point communication protocol;
   a power supply;
   a plurality of input devices;
   a processor coupled with said display, said memory, said transceiver, said power supply, and said plurality of input devices wherein said processor is configured to
      communicate with said first external Internet enabled device using said transceiver to obtain said first copyright controlled data set;
      display said data on said display;
      identify said first external Internet enabled device as a single parent copyright-material-owning device;
      identify the remote viewing apparatus to said first external Internet enabled device as a certified subordinate device that will only receive copyright-protected material from said first external Internet enabled device, and not receive copyrighted-protected material from another Internet enabled device while the remote viewing apparatus is subordinate to said first external Internal enabled device, such that the apparatus is configured to be strictly subordinate to one parent copyright-material-owning device at a time; and
      prevent transfer of said copyright controlled data set out of said memory to any other device.

2. The remote viewing apparatus of claim 1 wherein said processor is further configured to
   communicate with a second external Internet enabled device;
   identify said second external Internet enabled device as said single parent copyright-material-owning device to obtain a second copyright controlled data set; and
   eliminate copyright controlled data associated with said first external Internet enabled device, after which only action from said second external Internet enabled device is considered said action from said single parent copyright-material-owning device.

3. The remote viewing apparatus of claim 1 wherein said remote viewing apparatus does not comprise a keyboard having alphabetical or numeric keys, does not comprise a telephony-connection, does not comprise a microphone and does not comprise a speaker.

4. The remote viewing apparatus of claim 1 wherein said transceiver comprises wireless technology or low powered wireless technology.

5. The remote viewing apparatus of claim 1 with an added wired port coupled with said processor and configured to provide power to said power supply and/or to communicate with said first external Internet enabled device as an alternate means to receive copyright-controlled data.

6. The remote viewing apparatus of claim 5 wherein said wired port comprises USB or micro USB.

7. The remote viewing apparatus of claim 1 wherein said processor is configured to display said data that was displayed when said apparatus was last powered off,
   display a next page of a current document,
   display a prior page of said current document,
   display a next section or chapter of said current document,
   display a prior section or chapter of said current document,
   display text from said external Internet enabled device directly on said display,
   list and select from sections or chapters of said current document,
   list and select from documents in a bookshelf that comprises a list of documents locally stored in said memory,
   removing a document from those listed in said bookshelf,
   control said transceiver to receive said data from the external Internet enabled device,
   disable said transceiver, and,
   save said data that is currently displayed.

8. The remote viewing apparatus of claim 2 wherein said processor is configured to ensure that said first copyright controlled data set obtained from said first external Internet enabled device is erased from said memory if said memory is not regularly synchronized with said first external Internet enabled device, after which only action from said second external Internet enabled device is considered said action from said single parent copyright-material-owning device.

9. The remote viewing apparatus of claim 1 wherein said processor is configured to coordinate said display content from said first external Internet enabled device including e-mail or World-Wide Web page content on said display in order to effectively increase a display size of said first external Internet enabled device.

10. The remote viewing apparatus of claim 1 wherein said first Internet enabled device is a smartphone.

11. A remote viewing apparatus comprising:
   a display comprising a non-touch-sensitive electronic-ink display screen;
   a memory that is persistent and configured to store and retrieve a first copyright controlled data set including text and messages;
   a transceiver configured to communicate with at least a first external Internet enabled device using a low power point to point communication protocol wherein said transceiver is a wireless technology interface and does not include a Ethernet or 3G interface;
   a battery;
   a plurality of input devices;

a wired port configured to provide power to said battery and/or communicate with the first external Internet enabled device or a server; and, a processor coupled with said display, said memory, said transceiver, said battery, said plurality of input devices and said wired port wherein said processor is configured to communicate with the first external Internet enabled device to obtain said first copyright controlled data set;

display said data on said display;

identify said first external Internet enabled device as a single parent copyright-material-owning device;

identify the remote viewing apparatus to said first external Internet enabled device as a certified subordinate device that will only receive copyright-protected material from said first external Internet enabled device, and not receive copyrighted-protected material from another Internet enabled device while the remote viewing apparatus is subordinate to said first external Internal enabled device, such that the apparatus is configured to be strictly subordinate to one parent copyright-material-owning device at a time and unable to retain copyrighted material received from more than one single parent copyright-material-owning device;

prevent transfer of said copyright controlled data set out of said transceiver to any other device;

communicate with a second external Internet enabled device;

identify said second external Internet enabled device as said single parent copyright-material-owning device to obtain a second copyright controlled data set; and eliminate copyright controlled data associated with said first external Internet enabled device, after which only action from said second external Internet enabled device is considered said action from said single parent copyright-material-owning device.

12. The remote viewing apparatus of claim 11 wherein said remote viewing apparatus does not comprise a keyboard having alphabetical or numeric keys, does not comprise a telephony-connection, does not comprise a microphone and does not comprise a speaker.

13. The remote viewing apparatus of claim 11 wherein said transceiver is powered on to communicate with said first external Internet enabled device and said second external Internet enabled device, and wherein said transceiver is powered off after said data has been obtained.

14. The remote viewing apparatus of claim 11 wherein said wired port comprises USB or micro USB.

15. The remote viewing apparatus of claim 11 wherein said processor is configured to display said data that was displayed when said apparatus was last powered off, display a next page of a current document, display a prior page of said current document, display a next section or chapter of said current document, display a prior section or chapter of said current document, display text from said external Smartphone directly on said display, list and select from sections or chapters of said current document, list and select from documents in a bookshelf that comprises a list of documents locally stored in said memory, removing a document from those listed in said bookshelf, control said transceiver to receive said data from the external Smartphone, disable said transceiver, and, save said data that is currently displayed.

16. The remote viewing apparatus of claim 11 wherein said processor is configured to ensure that said first copyright controlled data set obtained from said first external Internet enabled device is erased from said memory if said memory is not regularly synchronized with said first external Internet enabled device.

17. The remote viewing apparatus of claim 11 wherein said processor is configured to coordinate said display content from said first external Internet enabled device including e-mail or World-Wide Web page content on said display in order to effectively increase a display size of said first external Internet enabled device.

18. A remote viewing apparatus comprising:

a display comprising a non-touch-sensitive electronic-ink display screen;

a memory that is persistent and configured to store and retrieve a first copyright controlled data set including text and messages;

a transceiver configured to communicate with a first external Internet enabled device or a server using a low power point to point communication protocol wherein said transceiver is a wireless technology interface and does not include a Ethernet or 3G interface and wherein said transceiver is powered on to communicate with said first external Internet enabled device or said server and wherein said transceiver is powered off after said data has been obtained and/or wherein said transceiver is powered off after said wired port is connected with said first external Internet enabled device or said server;

a battery;

a plurality of input devices;

a wired port configured to provide power to said battery and/or communicate with said first external Internet enabled device or said server wherein said wired port comprises USB or micro USB;

a processor coupled with said display, said memory, said transceiver, said battery, said plurality of input devices and said wired port wherein said processor is configured to communicate with said first external Internet enabled device to obtain said first copyright controlled data set;

display said data on said display;

securely identify the apparatus to the said external Internet enabled device as a certified subordinate device that will receive copyright-protected material, but will never send copyright-protected material, and that will not retain copyright-protected material sent from another Internet enabled device while receiving copyright-protected material from the currently connected internet-enabled device;

prevent transfer of said copyright controlled data set out of said transceiver to any other device;

power off if no input has been received from said plurality of input devices for a predetermined amount of time;

display said data that was displayed when said apparatus was last powered off, display a next page of a current document, display a prior page of said current document, display a next section or chapter of said current document, display a prior section or chapter of said current document, display text from said external Smartphone directly on said display, list and select from sections or chapters of said current document, list and select from documents in a bookshelf that comprises a list of documents locally stored in said memory, removing a document from those listed in said bookshelf, control said transceiver to receive said data from the external Smartphone, disable said transceiver, save said data that is currently displayed, ensure that said first copyright controlled data set obtained from the first external Internet enabled device is erased from said memory if said memory is not synchronized with the first external Internet enabled device within a pre-specified time period of the previous synchronization, and coordinate said display content from said first external Internet enabled device including e-mail or World-Wide Web page content on said display in order to effectively increase a display size of said first external Internet enabled device;

wherein said remote viewing apparatus does not comprise a keyboard having alphabetical or numeric keys, does not comprise a telephony-connection, does not comprise a microphone and does not comprise a speaker.

* * * * *